March 19, 1963 — W. SCHLAPP ETAL — 3,081,685
REFLEX CAMERA

Filed March 2, 1961 — 5 Sheets-Sheet 1

INVENTORS
WERNER SCHLAPP
PAUL NAUMANN

By Toulmin & Toulmin
Attorneys

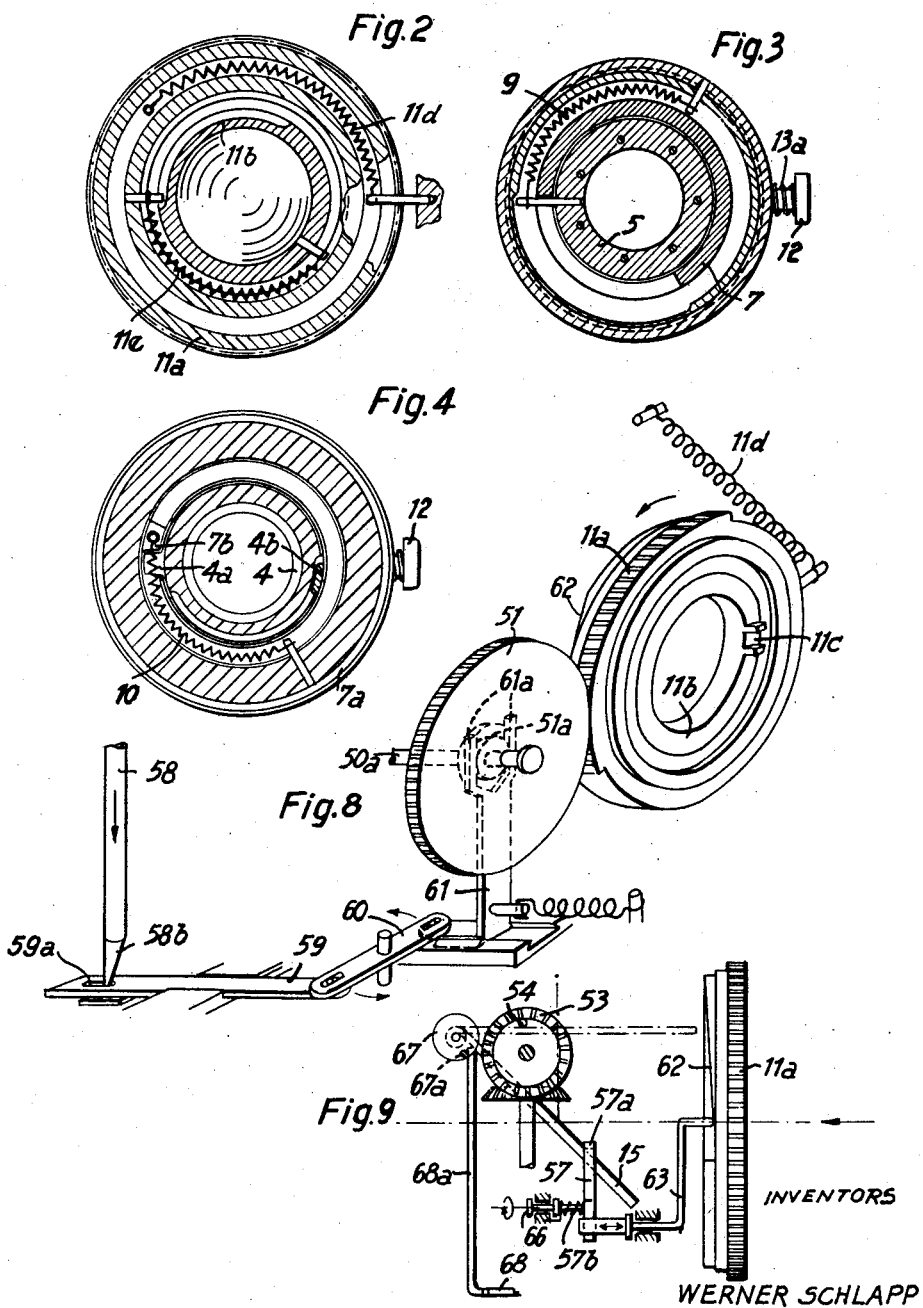

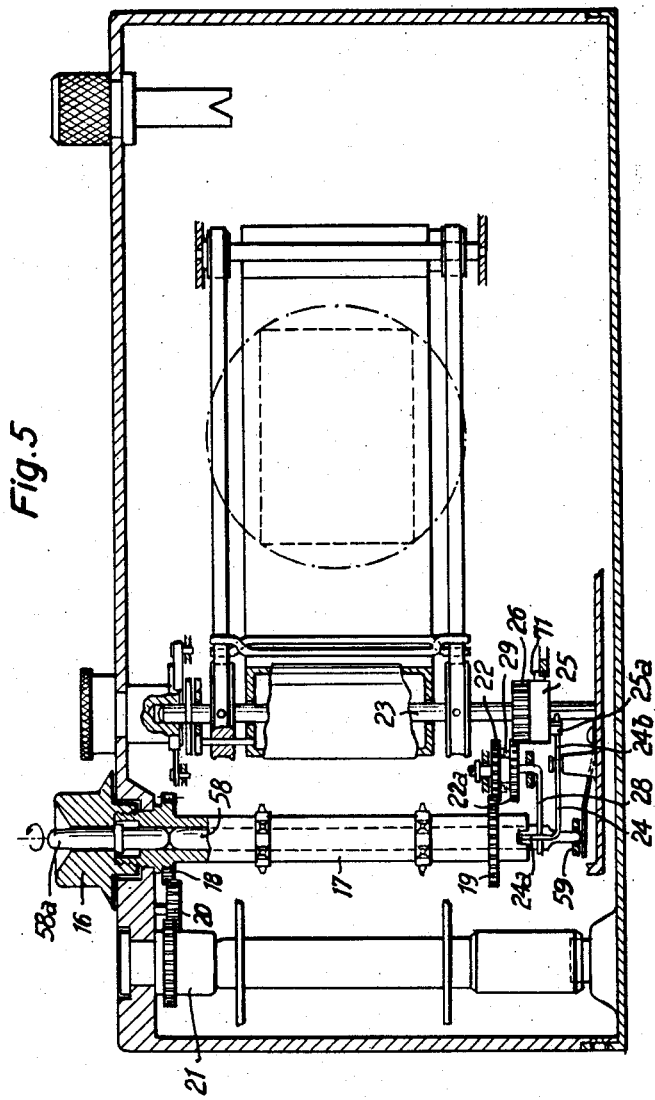

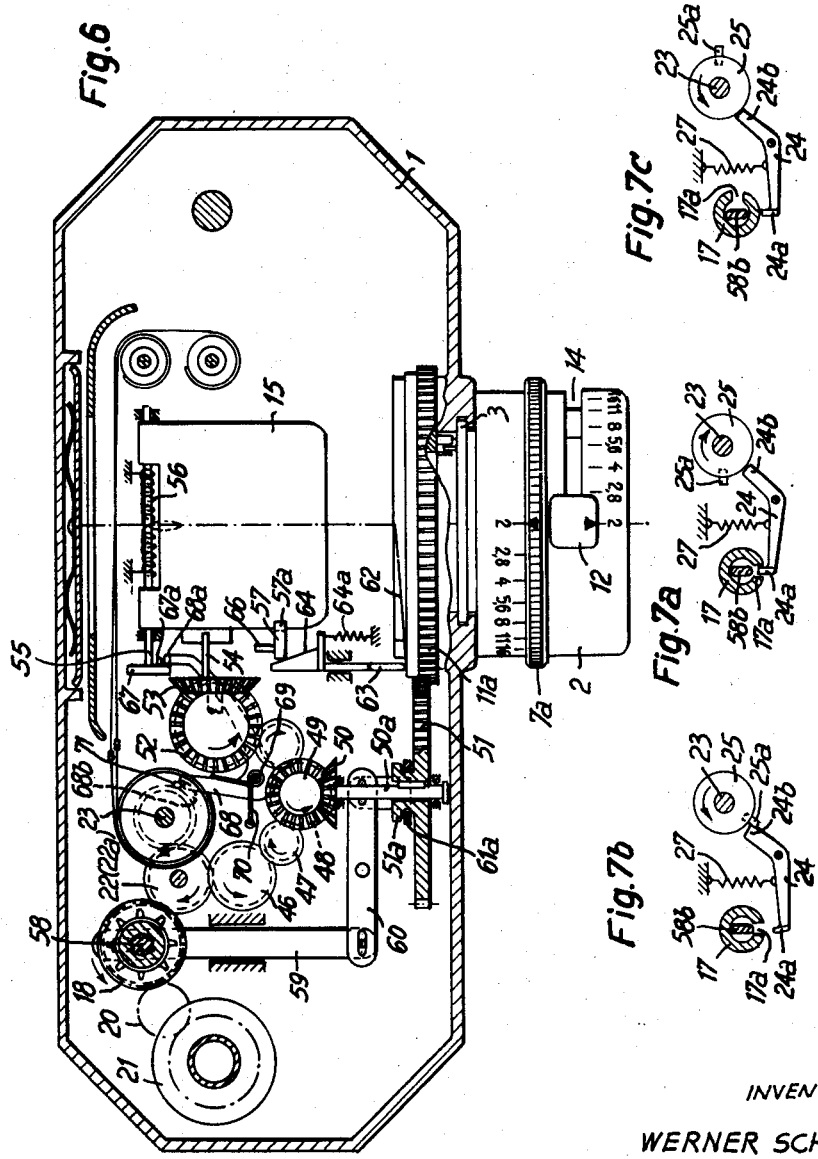

March 19, 1963    W. SCHLAPP ETAL    3,081,685
REFLEX CAMERA
Filed March 2, 1961    5 Sheets-Sheet 5
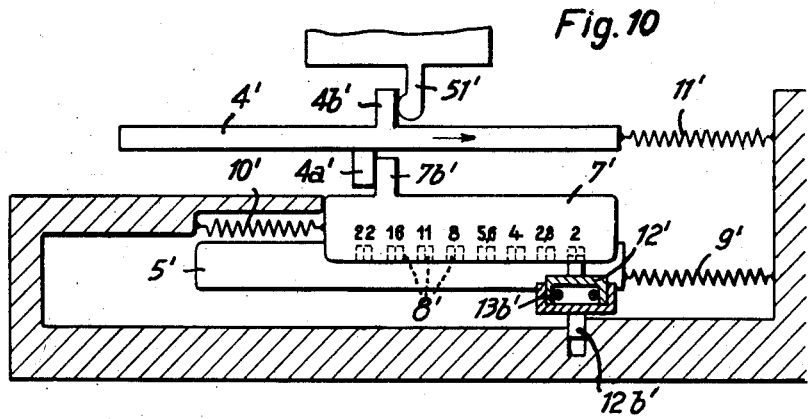
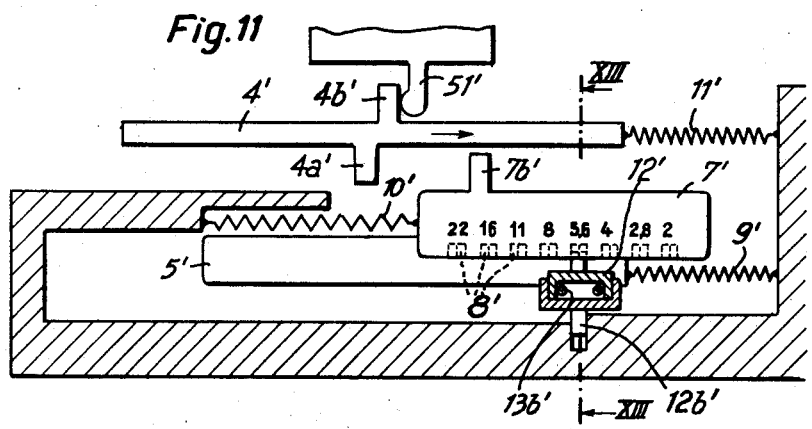
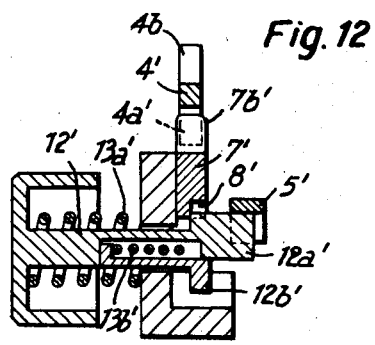
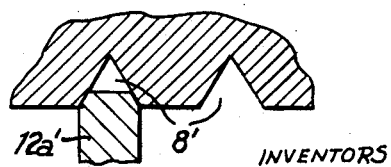
INVENTORS
WERNER SCHLAPP
PAUL NAUMANN
By Toulmin & Toulmin
Attorneys United States Patent Office 3,081,685
Patented Mar. 19, 1963

3,081,685
REFLEX CAMERA
Werner Schlapp, Asslar, Kreis Wetzlar, and Paul Naumann, Wetzlar (Lahn), Germany, assignors to Ernst Leitz Gesellschaft mit beschränkter Haftung, Wetzlar (Lahn), Germany
Filed Mar. 2, 1961, Ser. No. 92,972
Claims priority, application Germany Mar. 3, 1960
4 Claims. (Cl. 95—64)

The present invention relates to a reflex camera having a diaphragm which can be preset to a desired opening, more particularly, to a structure for checking the local field of the preset diaphragm opening prior to actuating of the camera release mechanism and exposure of the film in the camera.

Monocular reflex cameras have been provided with semi- or fully automatic preadjustable diaphragms. These diaphragms are composed of a plurality of diaphragm blades which are held by a spring in the position in which the diaphragm opening is at its maximum when the camera mechanism is in its normal position. When the release mechanism has been actuated to open the shutter, the diaphragm will then close to a diaphragm opening which has been previously determined by means of a preselector ring. In cameras having semi-automatic diaphragms the diaphragm blades are manually returned into the position of maximum diaphragm opening after the exposure time of the camera. The structure for returning the blades to the maximum position is operable from the outside of the camera.

In fully automatic diaphragm the diaphragm blades are operatively connected with the mechanism for winding of the shutter so that the diaphragm blades are returned to their maximum opened position when the shutter winding mechanism is actuated. In addition, the return movement of the blades may be coupled with the mechanism for advancing the film in the camera for the next exposure.

One major disadvantage of the reflex cameras employing the diaphragm as described above is that the user of the camera is unable to check the depth of the focal field of the particular diaphragm opening which he has selected. The mechanism does not make it possible for the user of the camera to first close the diaphragm to this preselected opening prior to exposure of the film in the camera.

It is therefore the principal object of this invention to provide a novel and improved reflex camera having a preadjustable diaphragm opening.

It is another object of this invention to provide a reflex camera having a preadjustable diaphragm opening wherein the focal field of the preselected diaphragm opening can be checked by the user of the camera before each shot of the camera.

The present invention provides a mechanism for eliminating the above-mentioned disadvantage of reflex cameras and for achieving the objects of this invention.

The present invention essentially comprises two diaphragm blade rings both of which are pivotally mounted for movement independently of the other. One of these rings is operatively connected to the mechanism for actuating the diaphragm to its predetermined opening and the other ring is adjustable by a structure which is actuated from the exterior of the camera. This second ring which is connected to the diaphragm is actuated independently of the preselection mechanism. The user can therefore utilize the view finder to determine the effect of the focal field of the preselected diaphragm opening.

It has been previously known to provide a reflex camera with two pivotally mounted diaphragm blade rings. However, this blade ring structure was used for other purposes which had nothing to do with adjusting the diaphragm to its preselected opening prior to exposure of the film within the camera.

In the present invention one of the diaphragm blades is actuated from the outside of the camera by the user to close the diaphragm to the preselected opening. A return spring is operatively connected to this blade ring to return the diaphragm to its initial maximum opening position when the adjusting device is released.

The invention offers a further modification which includes a structure for automatically adjusting the preselection blade ring to the desired exposure value when rotating the other blade ring from a position exterior of the camera. Such a structure may comprise a releasable coupling between the preselection ring and the blade ring which is operable from the outside of the camera. This coupling enables the user of the camera to couple the exteriorly operable ring into any position with respect to the preselector diaphragm ring. The structure also comprises a return spring which biasses the blade ring coupled with the preselector diaphragm ring against the action of a spring which biasses the preselector diaphragm ring back to its initial position.

Other objects and advantages of this invention will become apparent upon the accompanying description when taken in conjunction with the following drawings, wherein FIGURE 1 is an axial sectional view of the objective of a reflex camera of this invention and illustrating the rotatably mounted rings and the coupling between one blade ring and the preselector diaphragm ring.

FIGURES 2, 3 and 4 are transverse sectional views through the objective as illustrated in FIGURE 1 and showing the arrangement of the biassing springs with respect to the diaphragm blade rings;

FIGURE 5 is a longitudinal sectional view through the camera showing the various mechanisms therein which are coupled to the release mechanism of the camera;

FIGURE 6 is a top plan view of the interior of the camera as illustrated in FIGURE 5;

FIGURES 7a through 7c illustrate the components of the mechanism for the film-feeding;

FIGURE 8 is a perspective view of the diaphragm release mechanism;

FIGURE 9 is a side elevational view of the mechanism for releasing the reflector;

FIGURES 10 through 13 are four schematic views of the components effecting the control of the depth of the focal field and the automatic selection of the diaphragm.

A specific embodiment and modifications of this invention will next be described with reference to the accompanying drawings wherein like reference symbols indicate the same parts throughout the various views.

Figure 1:
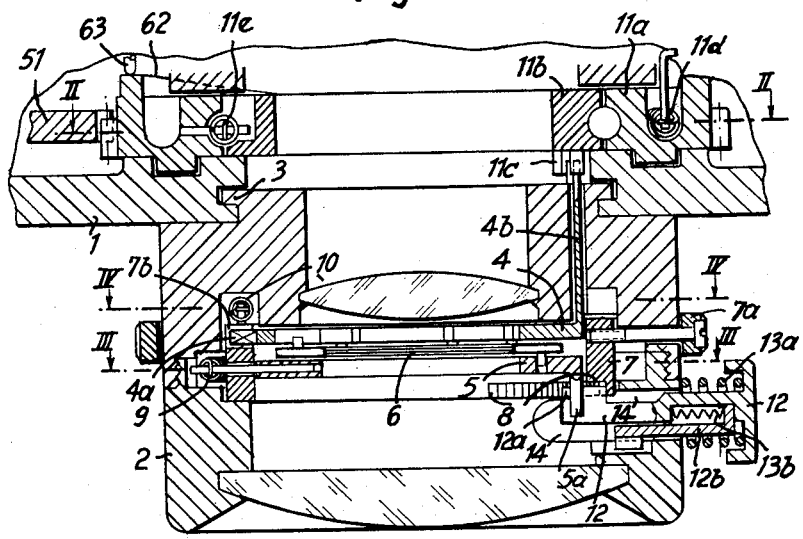
FIGURE 1a is similar to FIGURE 1 except that this embodiment has no coupling between one blade ring and the preselector diaphragm ring.

Returning now to FIGURE 1 there is shown a camera casing 1 which has an objective 2 mounted thereon by means of a bayonet mounting 3. The objective 2 is provided with an iris diaphragm which comprises a diaphragm blade ring 4, a second diaphragm blade ring 5 and diaphragm blades 6. The blade rings 4 and 5 are positioned at either side of the diaphragm blade 6 and are adjustable with respect to each other. It is this adjustment by which the diaphragm is opened and closed.

A diaphragm preselector ring 7 is rotatably mounted within the objective, as can be seen in FIGURE 1, and is operated by an adjustment ring 7a which is rotatably mounted at the exterior of the objective. The preselector ring 7 has a stop 7b which co-acts with a tenon 4a extending from the blade ring 4. It is the position of this stop 7b, which position is predetermined by the camera user, which determines to what extent the diaphragm is closed prior to the exposure of film in the camera when the shutter release is actuated.

There are gear teeth 8 at the inner surface of the preselector ring 7 so as to form a portion of an internal gear. A spring 9 is connected to the ring 5 and spring 10 is connected to the preselector ring 7. The spring 9 acts on the ring 5 to bias this ring into the position in which the opening of the diaphragm is at the maximum. This is illustrated in FIGURE 3. In a similar way the spring 10 acts on the preselector ring so as to urge this ring into the position wherein the stop member 7b corresponds to the maximum aperture opening of the diaphragm as may be seen in FIGURE 4.

The blade ring 4 has a bracket 4b extending therefrom in axial direction where it is operatively connected through a coupling member 11c to a driving ring comprising an interior driving ring 11b and an exterior driving ring 11a. A spring 11e interconnects the driving rings 11a and 11b.

As a result of this arrangement the exterior driving ring 11a is driven through a constant angle during the winding and film-feeding steps. This angle is greater than the angle formed by all of the pitches of the diaphragm. The interior driving ring 11b is adjusted through a variable angle which angle is dependent in each case on the position of the preselector ring 7.

There is also a spring 11d which has one end fixedly mounted on the camera casing 1 and which acts upon the exterior driving ring 11a so as to draw out the exterior ring 11a and also the interior ring 11b through the spring connection 11e into a position in which the diaphragm has its minimum opening.

In order to actuate the diaphragm blades the blade ring 5 has a bracket 5a on its periphery which extends in axial direction. There is an adjusting member 12 which comprises a nose element 12a which is engageable by the bracket 5a. The adjusting member 12 essentially comprises two adjusting members 12 and 12b. The adjusting member 12 is adjustable in a radial direction against the action of a spring 13a. The nose 12a has a locking connection similar to that of a ratchet with the gear teeth 8 of the diaphragm preselector ring 7.

There is a spring 13b which acts upon the adjusting member 12b to lock this member in its end position on the objective mounting 2. The adjusting member is urged into this end position by the spring 9 which acts upon the diaphragm blade ring 5.

The functions of the adjusting elements 12 and 12b can only be performed successively upon actuation of the adjuster 12 on depressing the same. Upon depressing the adjusting member 12 the ratchet coupling between the blade ring 5 and the diaphragm preselector ring 7 is released. Upon further depression of the adjusting member 12 the locking bar 12b disengages with a slot in the objective mount 2. It is pointed out, however, that in each position of the adjusting member 12 the nose 12a remains connected with the blade ring 5 through the bracket 5a. This connection transmits the adjusting movement of the adjuster 12 that is moveably mounted in a slot 14 in the objective mount 2.

Figure 1A:
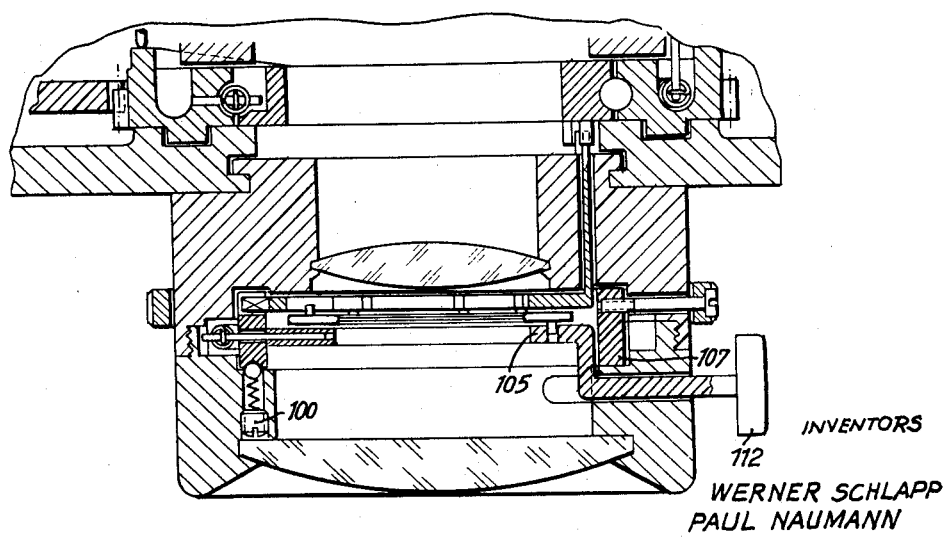

Proceeding next to FIGURE 1a there is illustrated a simplified embodiment of an objective equipped with the present invention. In this simplified embodiment the adjuster 112 functions only to rotate the blade ring 105 and the adjuster 112 cannot be coupled with the diaphragm preselector ring 107. As a result, the adjuster 112 has a considerably simpler structure since it is fixedly connected with the blade ring 105.

It is also pointed out that the preselector ring 107 does not have any internal gearing thereon in the manner of the preselector ring 7, as illustrated in FIGURE 1. Also, there is no spring acting upon the preselector ring 107 but instead a spring-actuated stopping device 100 is employed.

All the other components of the embodiment of FIGURE 1a perform the same function.

The embodiment of the invention as shown in FIGURE 1 enables the camera user to control the depth of the focal field in objectives comprising spring diaphragms. However, one cannot automatically adjust the diaphragm preselector ring to a desired exposure value without controlling the depth of the focal field.

The diaphragm driving rings 11a and 11b are operatively connected to a reflector 15 in a conventional manner for temporary coordination prior to the release of the shutter and as a function of the winding of the shutter and the film-feeding mechanism. To accomplish this function the following structure is provided: The camera is provided with a winding button or handle 16 which is connected to a film-feeding roll 17 upon which are fixedly mounted two gear wheels 18 and 19. The gear 18 is connected through an intermediate gear 20 with a film take-up reel 21 upon which the exposed film is wound. The gear 19 is coupled through intermediate gears 22 and 22a with a shaft 23 of a slotted shutter structure which is conventional and, correspondingly, is not described in further detail.

Between the gear 19 and the wall of the camera casing there is pivotally mounted a two-armed lever 24 having one end 24a which is engageable with a slot 17a in the film-feed roll 17. The other arm 24b cooperates with a cam 25a on a cam plate 25 which is fixedly mounted on the shutter axle 23. There is a spring 27 which biasses the lever 24 in such a direction so as to urge the lever arm 24a into engagement with the slot 17a. These components stabilize the steps through which film is fed and also function as a locking means against further turning of the film without exposing the film which is in exposed position.

The intermediate gears 22 and 22a are releasably connected with each other through a claw clutch 29. The intermediate gear 22a is connected through an arm 28 to a release rod 58 and is axially displaceable as a function of the movement of the release rod. The clutch 29 disengages the shutter axle 23 and the film-feed roll 17 during the return of the shutter after an exposure of the film.

A structure is provided for actuating the spring diaphragm and the hinge reflector 15 as a function of the shutter release and of the film-feed or shutter-setting device, respectively. This structure comprises a gear wheel 48 which is connected to the intermediate gear 22 by two additional intermediate gears 46 and 47. The gear wheel 48 is fixedly connected with a bevel gear 49 which meshes with a bevel gear 50 mounted on a shaft 50a. An axially moveable spur gear 51 is mounted on the shaft 50a and meshes with the gear teeth on the periphery of the driving ring 11a. The gear 51 has a boss at one end thereof with a circumferential notch 51a therein. The notch 51a receives the fork arms 61a. This structure will be subsequently described.

The gear wheel 48 is also drivingly connected to a bevel gear 52 which meshes with bevel gear 53. The following pin 54 is fixedly mounted on the bevel gear 53 and extends in an axial direction therefrom. The following pin cooperates with the reflector 15 in a manner which is presently described. The reflector 15 is pivotally mounted on a shaft 55 and is biassed by a spring 56 in a direction to be lifted up out of the path of light rays received through the objective. When the reflector 15 is in the downwardly reflecting position, as can be seen in FIGURE 9, it is retained in this position by a locking nose 57a which is integral with a pivotally mounted lever 57.

The release rod 58, which was previously described, is actuated by a release button 58a which is accessible from the exterior of the camera casing. The release button 58a, the diaphragm driving ring 11a, the reflector 15 and the shutter shaft 23 are operatively connected as follows:

The release rod 58 is mounted for axial movement within the film-feed roll 17 and is provided at its lower end with an inclined surface 58b which can be seen in FIGURE 8. The inclined surface 58b engages a notch 59a in a slidably mounted lever 59. The lever 59 moves along its longitudinal axis in a direction parallel to the optical axis of the camera. The lever 59 is connected through a pivotally mounted lever 60 with a slidably mounted shifting lever 61 which has at its upper end fork arms 61a which mesh with the annular groove 51a in a manner previously described.

The gear 51 meshes with the diaphragm driving ring 11a which is retained against the biassing action of the spring 11d by its engagement with the gear teeth of the gear 51. The driving ring 11a is provided with an axial cam surface 62 which enages a slidably mounted rod 63 upon the end of which is mounted an inclined surface 64. A spring 64a is employed to bias the pin 63 against the cam curve 62. The inclined surface 64 engages the pivotally mounted lever 57 and pivots the lever 57 against the action of a spring 57b which is mounted on a shaft 66 upon which is also mounted the lever 57. Pivoting of the lever 57 under the action of the inclined surface 64 will release the locking nose 57a from the reflector 15. Accordingly, the reflector will be pivoted from its reflecting or observing position to permit the exposure of the film.

The reflector shaft 55 has a disk 67 fixedly mounted on the end thereof with a follower pin 67a extending from said disc. The pin 67a coacts with an angular lever 68 which has an offset arm 68a extending into the path of the pin 67a. The second arm 68b is urged against the cam plate that is fixedly mounted on the shaft 23. A spring 70, as shown in FIGURE 6, biasses the arm 68 against the cam plate. The arm 68b cooperates with locking cam 71 which is arranged on the cam plate 25 and locks the shaft 23 against release when the locking cam 71 is engaged by the arm 68b.

When the shutter is in its wound-up position the shutter shaft 23 is prevented against unwinding by the lever arm 68b which, under the action of the spring 70, lockingly engages the cam 71 of the cam plate 25 which is fixedly connected with the shaft 23.

The adjustment of the diaphram preselector ring 7 to set the diaphragm for the desired opening can be performed in two different ways. In one way the ring 7 can be rotated to a desired diaphragm opening by means of the adjusting ring 7a. For this purpose the objective mount and the adjusting ring 7a are provided with diaphragm opening symbols and index marks, respectively, as can be seen in FIGURE 6. The preselector ring 7 is adjusted against the action of the spring 10 which urges the preselector ring into a position corresponding to the maximum diaphragm opening, as shown in FIGURE 4. In this adjustment the action of the spring 13a must be overcome since this spring urges the nose 12a into the internal gearing 8 of the preselector ring 7. The adjusting member 12 is maintained stationary by means of the adjusting element 12b. The nose 12a moves radially through a distance sufficient to disengage the nose from the gear teeth 8. The stop member 7b is adjusted for the arm 4a of the blade ring 4 according to the angular rotation of the preselector ring 7.

In the second adjusting process the diaphragm preselector ring 7 can be automatically adjusted after adjustments have been made in the camera with respect to the depth of the focal field. In this adjustment it is necessary that the coupling between the blade ring 5 and the preselector ring 7 be released. This is accomplished by depressing the adjusting member 12 until adjusting element 12b is released from the notch in the objective mount 2. The adjusting member 12 remains connected with the blade ring 5 and is now slidable in the groove 14 of the objective mount. Sliding the adjusting member 12 in this groove adjusts the blade ring 5. As the blade ring 5 is turned, the diaphragm opening is either increased or decreased, depending on the direction of movement of the adjusting member 12.

When the camera user has located a diaphragm opening which meets his requirements in view of the prevailing light conditions, he then releases the adjusting member. Three actions then occur. First, the blade ring 5 is coupled in this position with the preselector ring 7. Secondly, the blade ring 5 and the preselector ring 7 are driven back into the end position of the blade ring 5 under the action of the spring 9 and against the action of the spring 10 which is actuated on the preselector ring 7. Thirdly, the adjusting member 12 is fixed into an end position with respect to the objective mount by means of the adjusting element 12b.

Thus, the rotation of the blade ring 5 and the preselector ring 7, when coupled with each other, return the diaphragm to its maximum opening and cause the stop member 7b of the preselector ring 7 to move into a position corresponding to the diaphragm opening as selected by the user of the camera.

In FIGURES 5 and 6 the several components of the camera are shown in a position wherein the camera is in readiness for taking a picture. In this position the unexposed portion of the film has been moved into position, the shutter has been wound and the reflector 15 is positioned in its reflecting position in the path of the light rays received through the objective and the diaphragm driving rings 11a and 11b are in their initial position.

To operate the camera, the release rod mechanism 58 and 58a is depressed and, accordingly, the inclined surface 58b will cause an axial movement of the lever 59 in a direction parallel to the optical axis of the objective. The movement of the lever 59 will pivot the lever 60 and this pivoting movement will cause a shifting of the lever 61 to disengage the gear wheel 51 from the diaphragm driving ring 11a. Under the action of the spring 11d the driving ring 11a will rotate through an angle which has been previously determined and is constant in the direction of the arrow, as shown in FIGURE 8. The inner driving ring 11b, however, will pivot only through an angle until the arm 4a of the blade ring 4 engages the stop member 7b of the preselector ring 7. During the pivoting movement of the driving ring 11a the rod 63 will be axially moved by the cam surface 62. Accordingly, the inclined surface 64 will tilt the lever 68 about the shaft 60, to unlock the locking nose 57a from engagement with the reflector 15. Reflector 15, under the action of the spring 56, will pivot upwardly out of the path of the light rays received through the objective. In this position the reflector covers the view finder compartment.

The disc 67 turns simultaneously with the reflector shaft 55 and at the end of the reflector shaft movement the follower pin 67a will engage the arm 68a of the lever 68 which is so pivoted, that the arm 68b is released from the cam 71. As a result, the shutter shaft 53 is released for rotation.

When the release rod 58 is depressed, the gear wheel 22a, which is mounted on the rod 58, is axially displaced to release the clutch 29. Therefore, the rotation of the shaft 23 cannot be transmitted to the film-feed roll 17. Only the gear wheel 22 is rotating concurrently with the unwinding of the shutter.

The rewinding of the shutter, the feeding of the film, the winding of the spring diaphragm mechanism and the pivoting of the reflector 15 into the path of the light rays received through the objective are all accomplished by rotating the winding button 16 in the direction of the arrow shown in FIGURE 5.

Rotation of the winding button 16 will also rotate the film-feed roll 17 which is connected thereto. The roll 17 has gear teeth thereon which mesh with the perforations of the film and unroll the film from the supply reel and push the film in a direction of the take-up reel 21. The reel 21 is driven by the gear wheel 18 through the intermediate gear 20.

Rotation of the film-feed roll 17 simultaneously rotates the shutter shaft 23 through the gear 19 by means of the intermediate gears 22 and 22a. The cam 25a, as seen in FIGURE 7b, will move in the direction of the arrow so that the crank lever 24, under the action of the spring 27, engages the periphery of the feed roll 17. After rotation of the feed roll through an angle of 360° the lever arm 24a will mesh with the slot 17a to lock the film-feed roll against further rotation.

All of the previously described transmission members and operative connections are so chosen that, after the film-feed roll has rotated through 360°, all of the adjusting members have reached their end positions. Thus, the driving rings 11a and 11b are pushed against the action of the spring 11d through the gearing 22, 22a, 46, 47 and 48 by the bevel gears 49 and 50 together with the auxiliary displaceable spur gear 51. Accordingly, the blade ring 4 is returned to its initial position, which is the maximum diaphragm opening, through the coupling member 11c and the bracket 4b.

The bevel gears 52 and 53 are rotated through an intermediate gear 48 and other intermediate gears. The gear 53 is also rotated through an angle of 360° so that the pin 54, affixed thereto urges the reflector 15 into its reflecting position where it is held in position by the locking nose 57a. The pin 54 then returns to its initial position and the camera is again prepared to take pictures.

The movement of the several components in the objective are schematically illustrated in FIGURES 10 through 13. To facilitate the description of this operation the same reference symbols are employed for the corresponding components but a prime (') has been added to the symbols.

Thus, the two blade rings are designated by 4' and 5' and the diaphragm preselector indicated by 7'. The adjusting member 12' is permanently connected with the blade ring 5' through the ends 12a', as shown in FIGURE 12 and it is releasably connected with the gear teeth 8' in the selector ring 7'. The adjusting member 12' is releasably locked with respect to the camera casing by the locking bar 12b'. Springs 13a' and 13b' act on the adjusting members 12' and 12b', respectively. The blade ring 5', the blade ring 4' and the preselector ring 7' are similarly subjected to the action of springs 9', 11' and 10', respectively. In the schematic views, as illustrated in FIGURES 10 and 11, spring 11' replaces the diaphragm driving ring 11 which is illustrated in FIGURE 1.

The blade ring 4' comprises a stop member 4a' which cooperates with a stop member 7b' of the preselector ring 7' and another stop member 4b' which coacts with control member 51' which is supported in the casing of the camera and acts as a function of the shutter release.

Since the diaphragm preselector ring 7' is coupled with the adjusting member 12' it is possible to urge the ring 7' against the action of the spring 10' without previously depressing the adjusting member 12'. This corresponds to the adjustment of the diaphragm preselector in a known manner.

In order to control the depth of the focal field and to adjust automatically the preselector ring 7' to the selected diaphragm opening, the adjusting member 12' is depressed. This disengages the coupling between the adjusting member 12', the blade ring 5' and the diaphragm preselector ring 7', on one hand, and the adjusting member 12b' from the notch in the objective mount, on the other hand. At this time the adjusting member 12' and the blade ring 5', which is coupled thereto, can be displaced to the right as viewed in the drawings, to progressively close the diaphragm. The adjusting member 12' is released in the position corresponding to the chosen diaphragm opening so that the nose 12a' meshes with the gear teeth 8' to couple the blade ring 5' with the preselector ring 7'. Since the spring 9' has considerably greater force than the spring 10', the blade ring 5' and the preselector ring 7' are driven sufficiently far so that the blade ring 5' cannot reach its initial position. During this return movement the adjusting member 12' slides along the wall of the objective mount and meshes again with the slot provided for this purpose only after the blade ring 5' has reached its initial position.

In FIGURE 11 there is shown the position of the gearing means, if, for example, a diaphragm aperture of 5.6 has been chosen and the adjusting member 12' has been released. The blade ring 5' has been driven back into its initial position and in this movement to this position has taken along the preselector ring 7'. As shown in FIGURE 11, the selector ring 7' has been coupled by the nose 12a' engaging the slot corresponding to the diaphragm opening of 5.6. When the blade ring 4' is released by the control member 41' the ring 4' turns under the action of the spring 11' to close the diaphragm.

The correct automatic adjustment of the diaphragm preselector ring 7', as a consequence of the diaphragm opening selected by pivoting the blade ring 5', is conditioned by opposing actions of the preselector ring 7' and the blade ring 5' when they are turned in the same direction. Thus, when the blade ring 5' is turned to the left, as viewed in FIGURES 10 and 11, the diaphragm must close. It is apparent that the diaphragm preselector ring 7' must be moved to the right in order to put the stop member 7a' into positions corresponding to the progressively smaller diaphragm opening.

Thus it is apparent that the present invention discloses an improved reflex camera having a spring diaphragm wherein the diaphragm can be closed to a predetermined opening prior to taking of a picture so that the user of the camera can check the depth of the focal field attainable with the selected diaphragm opening.

It will be understood that this invention is susceptible to modifications in order to adapt it to different usages and conditions and, accordingly, it is desired to comprehend such modifications within this invention as may fall within the scope of the appended claims.

What we claim is:

1. In a reflex camera having an objective with a diaphragm, said diaphragm being settable automatically to a preadjusted value in dependence on the actuation of the shutter release, the combination of a variable diaphragm, first and second pivotally mounted diaphragm blade rings on both sides of said diaphragm and independent of each other, means connected to said first ring for pivoting the same when a release mechanism of the camera is actuated, means connected to said second ring and extending to the exterior of said objective for adjusting said second ring to set the diaphragm opening, means for adjusting the position to which said first ring will close when actuated by a release mechanism of the camera, first spring means biasing said second ring to maintain said diaphragm at the maximum opening, second spring means biasing said first ring adjusting means to a position which enables said first ring to rotate to minimum diaphragm opening upon being released, said second spring means having a greater strength than said first spring means, and an adjusting member selectively coupling said second diaphragm ring and said first diaphragm ring adjusting means so that said coupling can be selectively released.

2. In a reflex camera having an objective with a diaphragm, said diaphragm being settable automatically to a preadjusted value in dependence on the actuation of the shutter release, the combination of a variable diaphragm, first and second pivotally mounted diaphragm blade rings on both sides of said diaphragm and independent of each other, means connected to said first ring for pivoting the same when a release mechanism of the camera is actuated, means connected to said second ring and extending to the exterior of said objective for adjusting said second ring to set the diaphragm opening, means for adjusting the position to which said first ring will close when actuated by a release mechanism of the camera, first spring means biassing said second ring to maintain said diaphragm at the maximum opening, second spring means biassing said first ring adjusting means to a position which enables said first ring to rotate to minimum diaphragm opening upon being released, said second spring means having a greater strength than said first spring means, an adjusting member selectively coupling said second diaphragm ring and said first diaphragm ring adjusting means so that said coupling can be selectively released, said adjusting member comprising a first element connected to said second diaphragm blade ring and coupling said second ring to said first ring adjusting means, and a second element for locking said adjusting member with respect to the camera objective.

3. In a reflex camera having an objective with diaphragm, said diaphragm being settable automatically to a preadjusted value in dependence on the actuation of the shutter release, the combination of a variable diaphragm, first and second pivotally mounted diaphragm blade rings on both sides of said diaphragm and independent of each other, means connected to said first ring for pivoting the same when a release mechanism of the camera is actuated, means connected to said second ring and extending to the exterior of said objective for adjusting said second ring to set the diaphragm opening, means for adjusting the position to which said first ring will close when actuated by a release mechanism of the camera, first spring means biassing said second ring to maintain said diaphragm at the maximum opening, second spring means biassing said first ring adjusting means to a position which enables said first ring to rotate to minimum diaphragm opening upon being released, said second spring means having a greater strength than said first spring means, an adjusting member selectively coupling said second diaphragm ring and said first diaphragm ring adjusting means so that said coupling can be selectively released, said adjusting member comprising a first element connected to said second diaphragm blade ring and coupling said second ring to said first ring adjusting means, a second element for locking said adjusting member with respect to the camera objective, and a first spring and a second spring urging said first and second elements, respectively, into their respective locking positions.

4. In a reflex camera having an objective with a diaphragm, said diaphragm being settable automatically to a preadjusted value in dependence on the actuation of the shutter release, the combination of a variable diaphragm, first and second pivotally mounted diaphragm blade rings on both sides of said diaphragm and independent of each other, means connected to said first ring for pivoting the same when a release mechanism of the camera is actuated, means connected to said second ring and extending to the exterior of said objective for adjusting said second ring to set the diaphragm opening, means for adjusting the position to which said first ring will close when actuated by a release mechanism of the camera, first spring means biassing said second ring to maintain said diaphragm at the maximum opening, second spring means biassing said first ring adjusting means to a position which enables said first ring to rotate to minimum diaphragm opening upon being released, said second spring means having a greater strength than said first spring means, an adjusting member selectively coupling said second diaphragm ring and said first diaphragm ring adjusting means so that said coupling can be selectively released, said adjusting member comprising a first element connected to said second diaphragm blade ring and coupling said second ring to said first ring adjusting means, and a second element for locking said adjusting member with respect to the camera objective, said first and second elements being slidably positioned with respect to each other so that when said adjusting member is actuated said first element unlocks before the second element unlocks.

References Cited in the file of this patent
UNITED STATES PATENTS

| | | |
|---|---|---|
| 2,580,324 | Schwarz | Dec. 25, 1951 |
| 2,730,025 | Faulhaber | Jan. 10, 1956 |
| 2,777,371 | Schutz | Jan. 15, 1957 |